United States Patent
Nakayama (10) Patent No.: US 11,206,348 B2
(45) Date of Patent: Dec. 21, 2021

(54) IMAGE APPARATUS TO GENERATE A COMBINED IMAGE, CONTROL METHOD FOR CONTROLLING AN APPARATUS TO GENERATE A COMBINED IMAGE, AND STORAGE MEDIUM

(71) Applicant: CANON KABUSHIKI KAISHA, Tokyo (JP)

(72) Inventor: Fumitaka Nakayama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 102 days.

(21) Appl. No.: 16/417,415

(22) Filed: May 20, 2019

(65) Prior Publication Data

US 2019/0373169 A1 Dec. 5, 2019

(30) Foreign Application Priority Data

May 31, 2018 (JP) .............................. JP2018-104921

(51) Int. Cl.
*H04N 5/232* (2006.01)
*G06T 7/30* (2017.01)

(52) U.S. Cl.
CPC ........... *H04N 5/23229* (2013.01); *G06T 7/30* (2017.01); *H04N 5/23225* (2013.01); *G06T 2207/10004* (2013.01); *G06T 2207/20221* (2013.01)

(58) Field of Classification Search
CPC ........... H04N 5/23229; H04N 5/23225; H04N 5/232123; H04N 5/232; H04N 9/045; G06T 7/30; G06T 2207/10004; G06T 2207/20221; G06T 5/009; G06T 5/003; G06T 2207/10148; G06T 5/50

See application file for complete search history.

(56) References Cited

U.S. PATENT DOCUMENTS 8,311,362 B2 * 11/2012 Tamaru .............. H04N 5/23212
382/275

FOREIGN PATENT DOCUMENTS

JP    2015-216532 A    12/2015

* cited by examiner

*Primary Examiner* — Twyler L Haskins
*Assistant Examiner* — Angel L Garces-Rivera
(74) *Attorney, Agent, or Firm* — Canon U.S.A., Inc. IP Division (57) ABSTRACT

An apparatus includes a detection unit configured to detect a contrast from a plurality of images of a focus position, wherein viewing angles of the plurality of images overlaps at least partially, an adjustment unit configured to adjust the contrast, a setting unit configured to set a combining ratio based on the adjusted contrast, and a combining unit configured to combine the plurality of images based on the set combining ratio to generate a combined image, wherein the adjustment unit spreads the contrast of the image in which a subject is brought into focus, among the plurality of images, and the setting unit sets, based on the contrast of a corresponding position in the plurality of images, the combining ratio for the combining to the corresponding position.

19 Claims, 12 Drawing Sheets

IMAGE APPARATUS TO GENERATE A COMBINED IMAGE, CONTROL METHOD FOR CONTROLLING AN APPARATUS TO GENERATE A COMBINED IMAGE, AND STORAGE MEDIUM

BACKGROUND OF THE INVENTION

Field of the Invention

The aspect of the embodiments relates to an image processing apparatus configured to combine a plurality of images of different focus positions.

Description of the Related Art

In a case of capturing images of a plurality of subjects situated at significantly different distances or images of a subject that is long in a depth direction using a digital camera, there is sometimes a situation in which the digital camera can focus only on one or some of the subjects due to an insufficient depth of field. As a solution to the situation, Japanese Patent Application Laid-Open No. 2015-216532 discusses a so-called depth combining technique in which a plurality of images of different focus positions is captured and only in-focus regions are extracted from the respective images and combined into a single image to thereby generate a combined image in which an entire image capturing region is in focus. In the technique discussed in Japanese Patent Application Laid-Open No. 2015-216532, a region having the highest contrast value among regions situated at the same position in the respective images is selected as an in-focus region.

Use of the above-described depth combining method, however, sometimes causes a blur region in an edge portion of a combined image.

Figure 12:
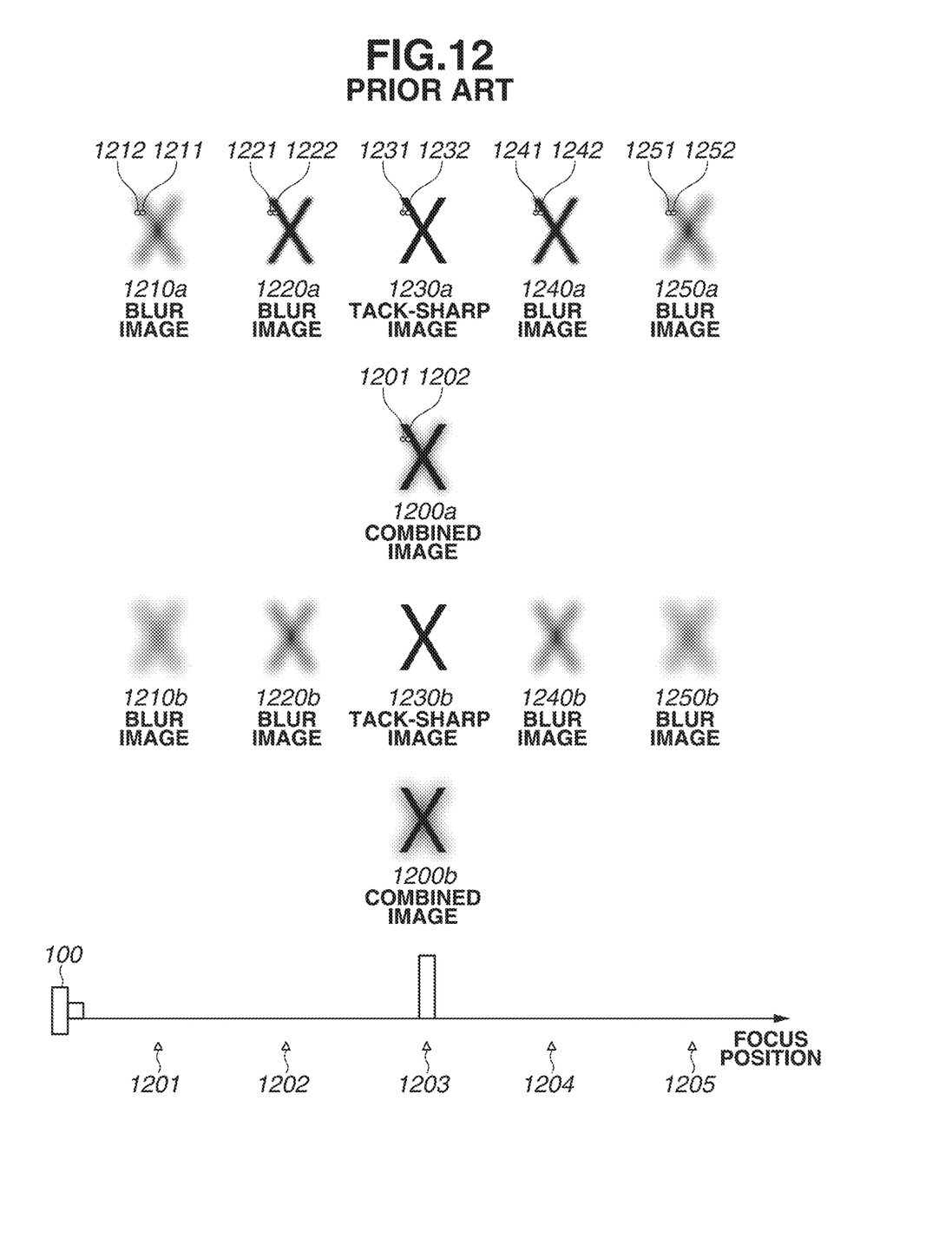
FIG. 12 illustrates an example of capturing images for depth combining.

FIG. 12 illustrates an example of capturing images for depth combining. In the case illustrated in FIG. 12, five images 1210a to 1250a of an X-shaped subject situated in front of a white background are captured at focus positions 1201 to 1205 by a digital camera 100 and combined together to thereby generate a combined image 1200a. The image 1210a is captured at the focus position 1201, and the images 1220a to 1250a respectively correspond to the focus positions 1202 to 1205. After the positions of the images 1210a to 1250a are adjusted, pixels 1211 to 1251 are at the same position, and pixels 1212 to 1252 are at the same position. In the case of generating a combined image using the technique discussed in Japanese Patent Application Laid-Open No. 2015-216532, a pixel having the highest contrast value among the pixels 1212 to 1252 is selected and used with respect to the corresponding position in the combined image. Thus, in FIG. 12, an image capturing apparatus uses the pixel 1232 in a combined image 1200a. However, in a case where the image capturing apparatus selects a pixel having the highest contrast value among the pixels 1212 to 1251 and uses the selected pixel with respect to the corresponding position in the combined image 1200a, the contrast value of the pixel 1212 or 1252 is higher than the contrast value of the pixel 1231. Thus, the pixel 1212 or 1252 is selected and used in the combined image 1200a. This causes a blur around an edge portion in the combined image 1200a, as illustrated in FIG. 12.

Images 1210b to 1250b are images captured by the digital camera 100 with a more opened aperture, and a combined image 1200b is a combined image generated using the images 1210b to 1250b. The combined image 1200b contains a blur wider than the blur in the combined image 1200a.

SUMMARY OF THE INVENTION

According to an aspect of the embodiments, an apparatus includes a detection unit configured to detect a contrast from a plurality of images of a focus position, wherein viewing angles of the plurality of images overlaps at least partially, an adjustment unit configured to adjust the contrast, a setting unit configured to set a combining ratio based on the adjusted contrast, and a combining unit configured to combine the plurality of images based on the set combining ratio to generate a combined image, wherein the adjustment unit spreads the contrast of the image in which a subject is brought into focus, among the plurality of images, and the setting unit sets, based on the contrast of a corresponding position in the plurality of images, the combining ratio for the combining to the corresponding position.

Further features of the disclosure will become apparent from the following description of exemplary embodiments with reference to the attached drawings.

DESCRIPTION OF THE EMBODIMENTS

Various exemplary embodiments of the disclosure will be described below with reference to the attached drawings.

Figure 1:
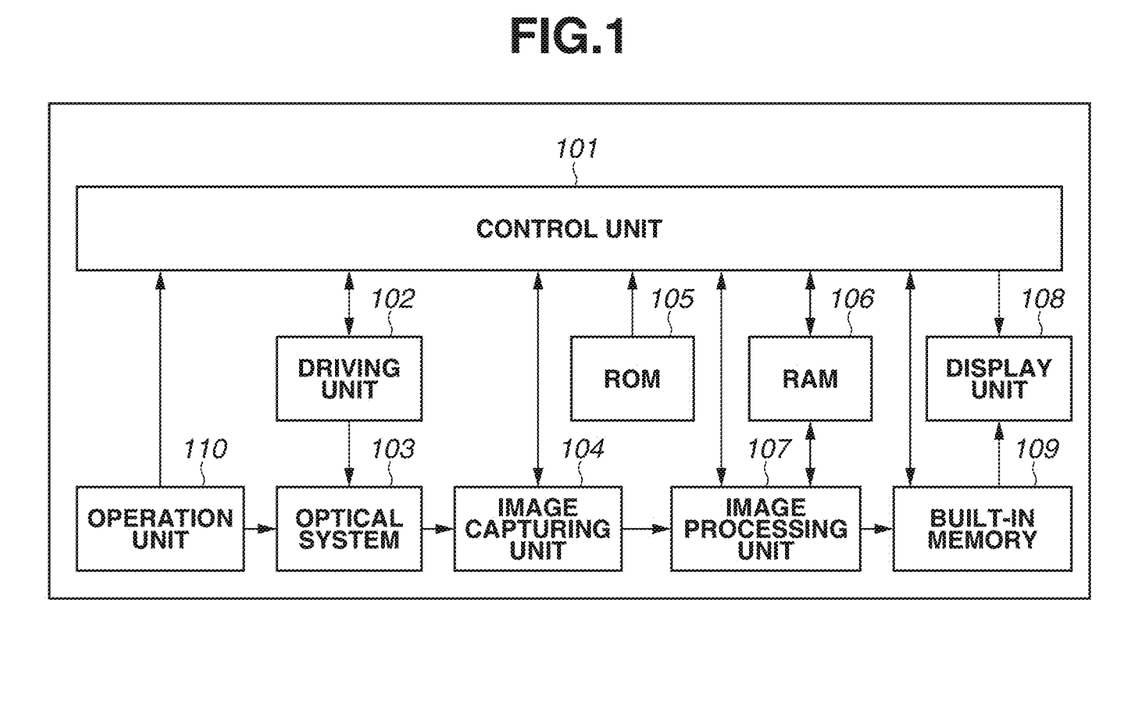
FIG. 1 is a block diagram illustrating a configuration of a digital camera according to an exemplary embodiment of the disclosure.

FIG. 1 is a block diagram illustrating a configuration of a digital camera as an image processing apparatus according to a first exemplary embodiment. A digital camera 100 is capable of capturing still images, recording in-focus position information, calculating a contrast value, and combining images. Further, the digital camera 100 is also capable of enlarging or reducing an image that is captured and stored or an image that is externally input.

A control unit 101 is a signal processor such as a central processing unit (CPU) or micro-processing unit (MPU). The control unit 101 reads a program stored in advance in a read-only memory (ROM) 105 described below to control each component of the digital camera 100. For example, as described below, the control unit 101 issues an instruction to start image capturing and an instruction to end image capturing to an image capturing unit 104 described below. Further, the control unit 101 issues an instruction to execute image processing to an image processing unit 107 described below based on the program stored in the ROM 105. A user instruction is input to the digital camera 100 via an operation unit 110 described below and is transmitted to a component of the digital camera 100 via the control unit 101.

A driving unit 102 includes a motor and mechanically operates an optical system 103 described below under an instruction from the control unit 101. For example, the driving unit 102 moves the position of a focus lens of the optical system 103 and adjusts the focal length of the optical system 103 based on an instruction from the control unit 101.

The optical system 103 includes a zoom lens, a focus lens, and a diaphragm. The diaphragm is a mechanism for adjusting the amount of transmission light. An in-focus position is changeable by changing a lens position.

The image capturing unit 104 is a photoelectric conversion element and photoelectrically converts an incident optical signal into an electric signal. For example, a charge-coupled device (CCD) sensor or complementary metal oxide semiconductor (CMOS) sensor is applicable to the image capturing unit 104. The image capturing unit 104 includes a moving image capturing mode and is capable of capturing a plurality of temporally-consecutive images as frames of a moving image.

The ROM 105 is a read-only non-volatile memory as a recording medium and stores an operation program for each block of the digital camera 100 and parameters for operations of each block. A random access memory (RAM) 106 is a rewritable volatile memory and is used as a temporary storage area for data output in an operation of a block of the digital camera 100.

The image processing unit 107 performs various kinds of image processing such as white balance adjustment, color interpolation, and filtering on an image output from the image capturing unit 104 or image signal data recorded in a built-in memory 109 described below. Further, the image processing unit 107 performs compression processing such as Joint Photographic Experts Group (JPEG) compression on image signal data captured by the image capturing unit 104.

The image processing unit 107 includes an application-specific integrated circuit (ASIC) in which circuits for performing specific processing are integrated. Alternatively, the control unit 101 may execute processing based on a program read from the ROM 105 to thereby perform part or all of functions of the image processing unit 107. In the case where the control unit 101 performs all of functions of the image processing unit 107, the image processing unit 107 does not have to be included as hardware.

A display unit 108 is a liquid crystal display or organic electroluminescence (EL) display for displaying an image temporarily stored in the RAM 106, an image stored in the built-in memory 109 described below, or a setting screen of the digital camera 100.

The built-in memory 109 is a location for recording an image captured by the image capturing unit 104, an image processed by the image processing unit 107, and information about in-focus positions during image capturing. A memory card can be used in place of the built-in memory.

The operation unit 110 is, for example, a button, switch, key, and mode dial provided to the digital camera 100 or a touch panel which is also used as the display unit 108. A user instruction is transmitted to the control unit 101 via the operation unit 110.

Figure 2:
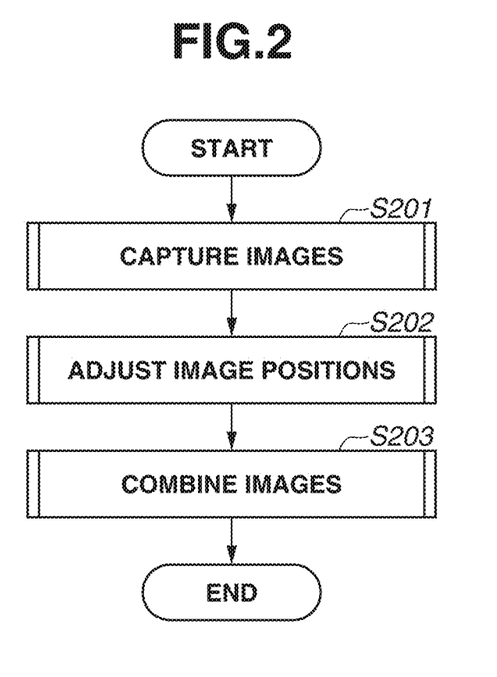
FIG. 2 is a flowchart illustrating a process of generating a combined image according to a first exemplary embodiment of the disclosure.

FIG. 2 is a flowchart illustrating a process of generating a combined image according to the present exemplary embodiment. In step S201, the image capturing unit 104 captures a plurality of images of different focus positions. In step S202, the control unit 101 adjusts the positions of the plurality of images captured in step S201 by the image capturing unit 104 so as to match viewing angles. In step S203, the image processing unit 107 combines the position-adjusted images to thereby generate a combined image. Each step will be described in detail below.

Figure 3:
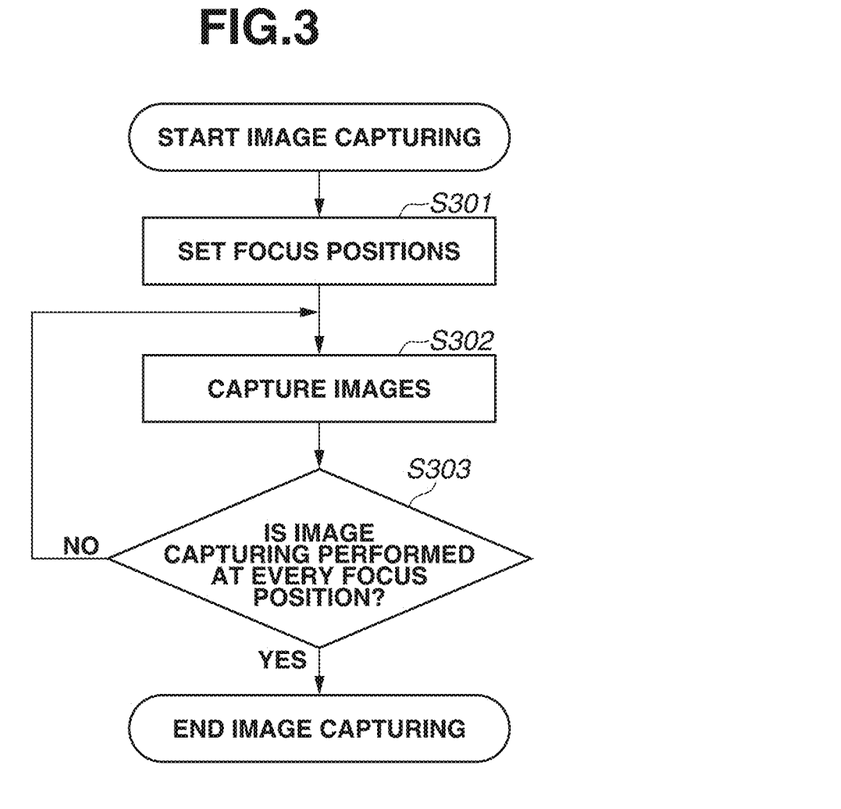
FIG. 3 is a flowchart illustrating an image capturing process according to the first exemplary embodiment of the disclosure.

FIG. 3 is a flowchart illustrating the image capturing in step S201 according to the present exemplary embodiment.

In step S301, the control unit 101 sets focus positions. For example, a user designates an in-focus position via the touch panel of the display unit 108, and a plurality of focus positions is designated at equally-spaced intervals before and after a focus position corresponding to the in-focus position in an optical axis direction. Simultaneously, the control unit 101 determines an image capturing order of the set focus positions in the order of distance.

In step S302, the image capturing unit 104 captures an image at the first one of the focus positions in the image capturing order among the focus positions which are set in step S301 and at which no image is yet captured.

In step S303, the control unit 101 determines whether image capturing is performed at every focus position set in step S301. If image capturing is performed at every focus position (YES in step S303), the process illustrated in the flowchart in FIG. 3 ends. On the other hand, if there is a focus position at which image capturing is not performed (NO in step S303), the processing returns to step S302.

Figure 4:
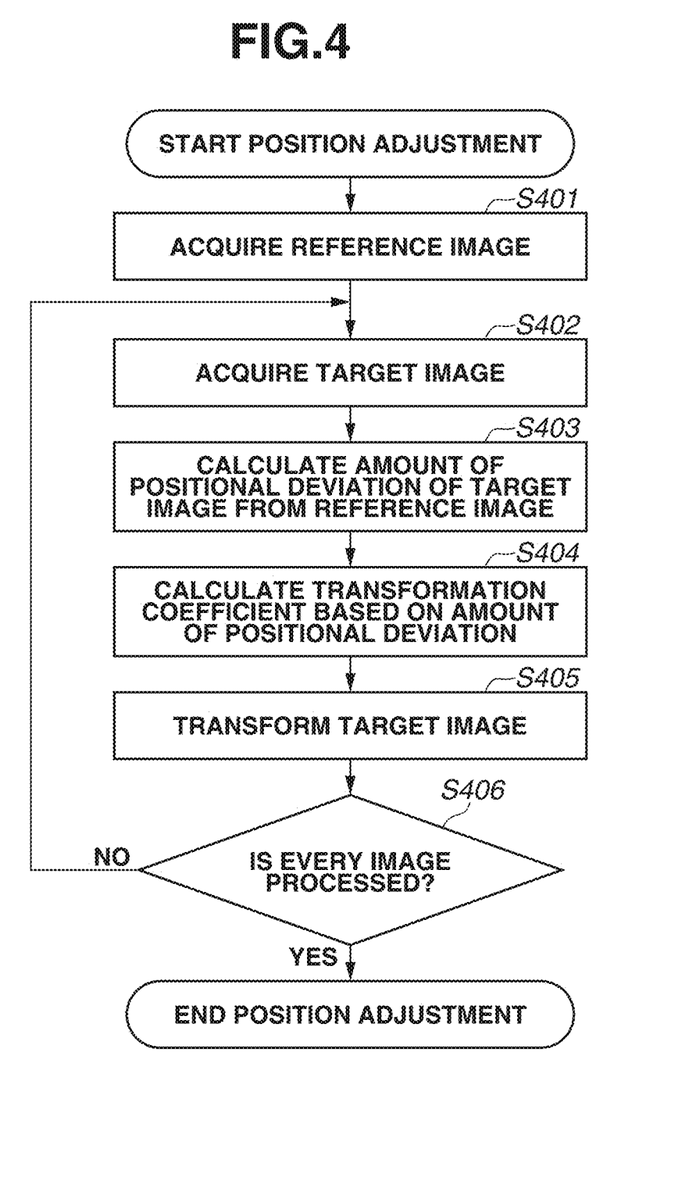
FIG. 4 is a flowchart illustrating a position adjustment process according to the first exemplary embodiment of the disclosure.

FIG. 4 is a flowchart illustrating the position adjustment in step S202 according to the present exemplary embodiment.

In step S401, the control unit 101 acquires a reference image for the position adjustment from among the images captured by the image capturing unit 104 in step S201. The first one of the images in the image capturing order is selected as the reference image for the position adjustment. Alternatively, since the images are captured while the focus position is changed, the viewing angle slightly changes between the captured images, so that the image that has the narrowest viewing angle can be selected.

In step S402, the control unit 101 acquires a target image for the position adjustment processing. The image that is not the reference image acquired in step S401 and does not yet undergo position adjustment is selected as the target image. In the case where the first one of the images in the image capturing order is selected as the reference image, the control unit 101 sequentially acquires the other images in the image capturing order as the target image.

In step S403, the control unit 101 calculates the amount of positional deviation of the target image from the reference image. An example of a calculation method is as follows.

First, the control unit 101 sets a plurality of blocks to the reference image. In one embodiment, the control unit 101 sets the plurality of blocks in such a manner that the plurality of blocks has the same size. Next, the control unit 101 sets a search range at each position in the target image that corresponds to each block of the reference image. Each search range is a range which is wider than each block of the reference image. Lastly, the control unit 101 calculates, with respect to each search range of the target image, a corresponding point at which the sum of absolute differences (SAD) in luminance between the search range and the block of the reference image is minimized. The control unit 101 calculates, as a vector, the positional deviation in step S403 using the center of each block of the reference image and the corresponding point. In the corresponding point calculation, the control unit 101 can use the sum of squared differences (SSD) or normalized cross correlation (NCC) besides SAD.

In step S404, the control unit 101 calculates a transformation coefficient based on the amount of positional deviation of the target image from the reference image. The control unit 101 uses, for example, a projection transformation coefficient as the transformation coefficient. The transformation coefficient, however, is not limited only to the projection transformation coefficient, and an affine transformation coefficient or a simplified transformation coefficient of only a horizontal/vertical shift can be used.

In step S405, the image processing unit 107 transforms the target image using the transformation coefficient calculated in step S404.

For example, the control unit 101 can perform deformation using formula 1 below.

$$I' = \begin{pmatrix} x' \\ y' \\ 1 \end{pmatrix} = AI = \begin{pmatrix} a & b & c \\ d & e & f \\ 0 & 0 & 1 \end{pmatrix} \cdot \begin{pmatrix} x \\ y \\ 1 \end{pmatrix} \quad \text{(formula 1)}$$

In formula 1, (x', y') are coordinates after the deformation, and (x, y) are coordinates before the deformation. Matrix A is the transformation coefficient calculated in step S404 by the control unit 101.

In step S406, the control unit 101 determines whether the position adjustment is performed on every image other than the reference image. If the position adjustment is performed on every image other than the reference image (YES in step S406), the process illustrated in the flowchart ends. On the other hand, if there remains an unprocessed image (NO in step S406), the processing returns to step S402.

Figure 5:
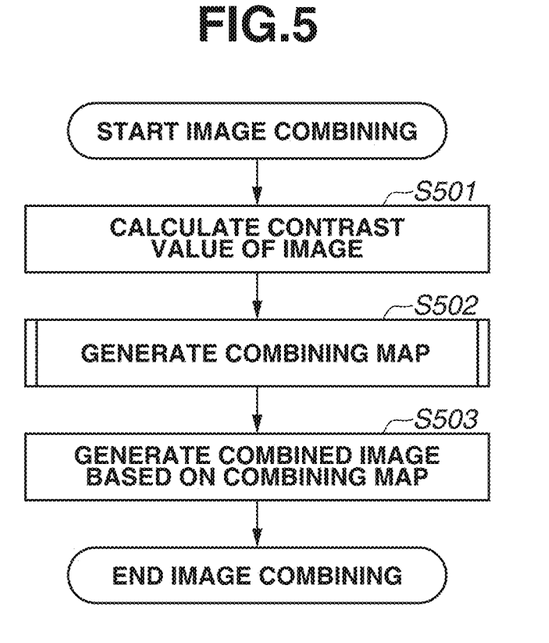
FIG. 5 is a flowchart illustrating an image combining according to the first exemplary embodiment of the disclosure.

FIG. 5 is a flowchart illustrating the image combining in step S203 according to the present exemplary embodiment.

In step 501, the image processing unit 107 calculates a contrast value with respect to each image having undergone the position adjustment (including the reference image). In an example of a calculation method of a contrast value, for example, first, the image processing unit 107 calculates a luminance value Y based on color signals Sr, Sg, and Sb of each pixel using formula 2 below.

$$Y = 0.299Sr + 0.587Sg + 0.114Sb \quad \text{(formula 2)}$$

Next, a contrast value I is calculated using a Sobel filter with respect to a matrix L of luminance Y of 3×3 pixels as specified by formulas 3 to 5 below.

$$I_h = \begin{pmatrix} -1 & 0 & 1 \\ -2 & 0 & 2 \\ -1 & 0 & 1 \end{pmatrix} \cdot L \quad \text{(formula 3)}$$

$$I_v = \begin{pmatrix} -1 & -2 & -1 \\ 0 & 0 & 0 \\ 1 & 2 & 1 \end{pmatrix} \cdot L \quad \text{(formula 4)}$$

$$I = \sqrt{I_h^2 + I_v^2} \quad \text{(formula 5)}$$

Further, the above-described calculation method of a contrast value is a mere example and, for example, an edge detection filter such as a Laplacian filter or a bandpass filter which allows pass in a predetermined band can be used.

In step S502, the image processing unit 107 generates a combining map. A specific method of generating a combining map will be described below.

In step S503, the image processing unit 107 generates a combined image based on the combining map calculated in step S502. In a case where a combining ratio calculated as described above changes from 0% to 100% (or from 100% to 0%) between adjacent pixels, the combined boundary is noticeably unnatural. Thus, a filter having a predetermined number of pixels (taps) is applied to the combining map to thereby prevent a sharp change in the combining ratio between adjacent pixels.

The process of generating the combining map in step S502 will be described in detail below.

Figure 6:
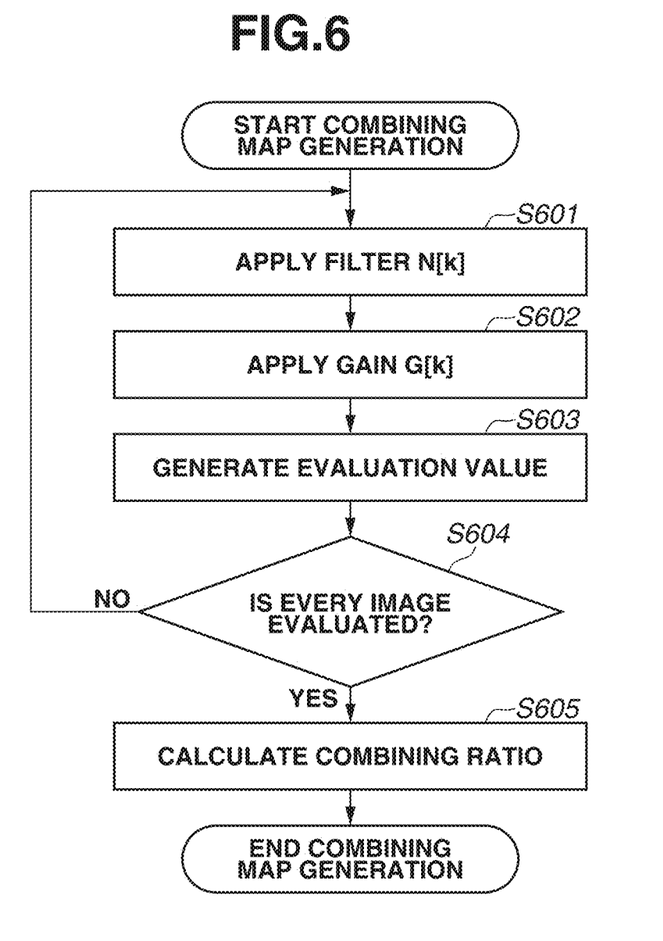
FIG. 6 is a flowchart illustrating a process of generating a combining map according to the first exemplary embodiment of the disclosure.
Figure 7:
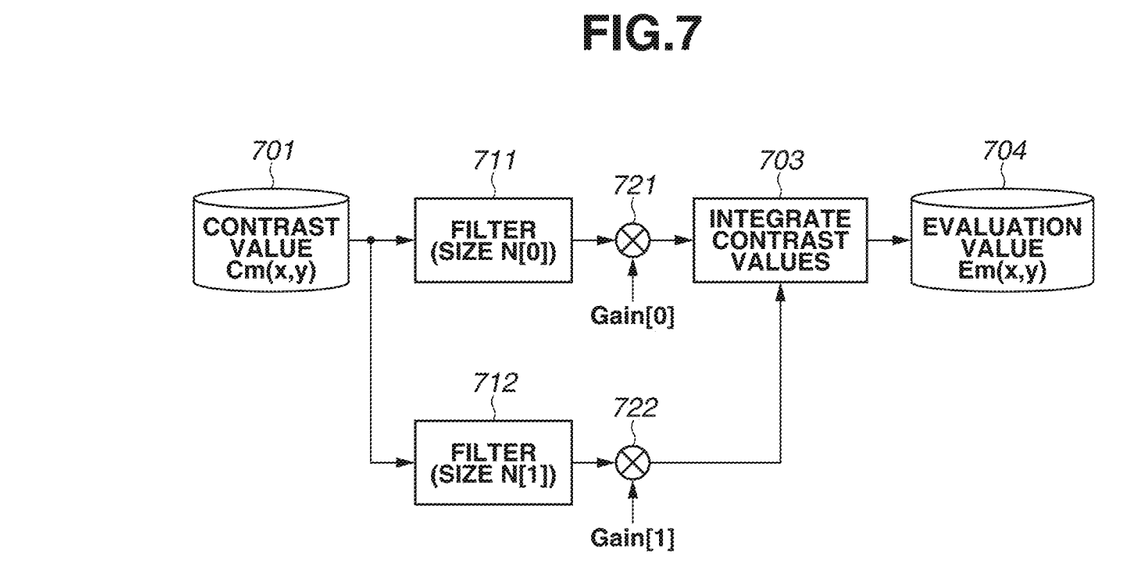
FIG. 7 is a block diagram illustrating the process of generating a combining map according to the first exemplary embodiment of the disclosure.

FIG. 6 is a flowchart illustrating the process of generating the combining map in step S502 according to the present exemplary embodiment. FIG. 7 is a block diagram illustrating the process of generating the combining map in step S502 according to the present exemplary embodiment.

In step S601, the image processing unit 107 performs filter processing on the contrast value calculated in step S501. For example, the 3×3 pixels in the contrast value calculation described above are used as a single block, and a filter is applied to each block included in the image. Examples of a filter type include a MAX filter which outputs the maximum contrast value and a mean value filter. Furthermore, in step S601, the image processing unit 107 applies filters of a different number of taps. While two types of filters N[0] and N[1] are to be applied for the convenience of description, the number of filters is not limited to two. The number of taps of the filter N[0] is less than the number of taps of the filter N[1]. Specifically, the reference range of the filter N[0] is narrower than the reference range of the filter N[1]. The filter N[0] can be configured to provide through-output (signal of which input and output are the same).

FIG. 7 is a block diagram illustrating the process of generating the combining map in step S502 according to the present exemplary embodiment. In FIG. 7, a contrast value 701 (Cm(x, y)) is the contrast value of the coordinates (x, y). In the case where the contrast value is calculated for each block, the contrast value of the block in which the coordinates (x, y) are situated is determined as the contrast value of the coordinates (x, y). The image processing unit 107 applies a filter 711 (N[0]) and a filter 712 (N[1]) to Cm(x, y). As a result of the processing, a blur in the image can be spread to a surrounding portion. It is expected that the contrast value is higher in a blur-spread portion in a tack-sharp image than in an edge blur portion in a blur image. In the evaluation value calculation described below, the contrast value of the portion of the tack-sharp image is likely to be calculated as a high value, and thus it is expected that not the blur image but the tack-sharp image is selected in the combining.

In step S602, the image processing unit 107 applies a gain Gain(k) to the results obtained by applying the filters in step S601. For example, in FIG. 7, the image processing unit 107 applies a gain Gain(0) to the result obtained by applying the filter 711 (N[0]) and applies a gain Gain(1) to the result obtained by applying the filter 712 (N[1]).

FIGS. 8A to 8F illustrate the contrast values according to the present exemplary embodiment. The contrast values before and after the filters are applied will be described briefly below with reference to FIGS. 8A to 8F.

Figure 8A:
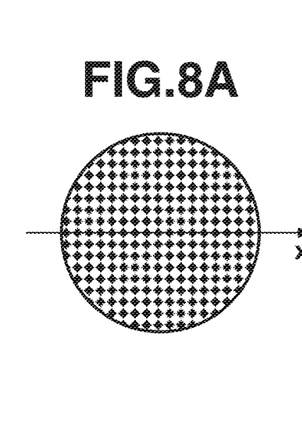
FIGS. 8A, 8B, 8C, 8D, 8E, and 8F illustrate a contrast value according to the first exemplary embodiment of the disclosure.
Figure 8B:
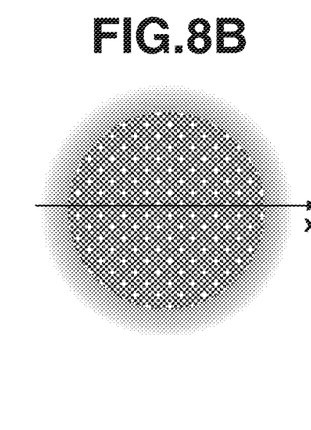

A case of capturing an image of a subject having a uniform pattern as illustrated in FIGS. 8A and 8B will be discussed. FIG. 8A illustrates an image captured when the subject is brought into focus, whereas FIG. 8B illustrates an image captured when the subject is not brought into focus. For simplicity, the contrast value on the x-axis passing through the center of the subject in FIGS. 8A and 8B is one-dimensionally analyzed.

Figure 8C:
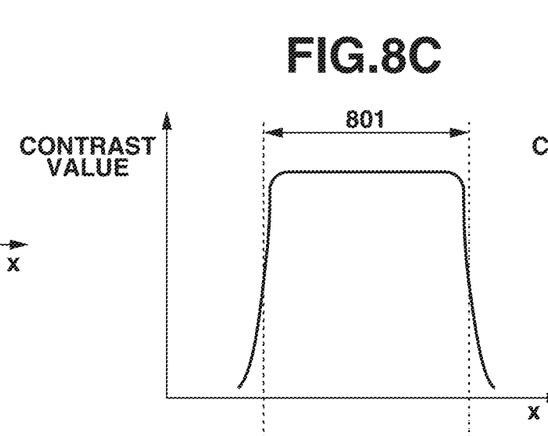
Figure 8D:
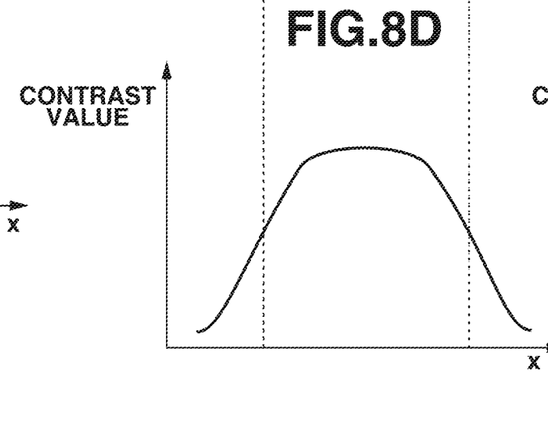

FIG. 8C illustrates the relationship between the contrast value of the subject brought into focus in FIG. 8A and the x-axis coordinate, whereas FIG. 8D illustrates the relationship between the contrast value of the subject that is not brought into focus in FIG. 8B and the x-axis coordinate. Since the subject in FIG. 8A has a uniform pattern, the contrast value in FIG. 8C is a uniform value while the x-coordinate is in the subject. On the other hand, in the case where the subject is blurred as in FIG. 8B, the contrast value while the x-coordinate is in the subject is lower than that in FIG. 8A. In FIG. 8B, there is a blur around the subject, so that the contrast value in FIG. 8D decreases not sharply as in FIG. 8C but gradually at each end.

In a comparison between FIGS. 8C and 8D, the contrast value in a range 801 is higher in FIG. 8C than in FIG. 8D, whereas the contrast value outside the range 801 is lower in FIG. 8C than in FIG. 8D. If the depth combining is performed on FIGS. 8A and 8B using the conventional technique described above in the background section, the blur in FIG. 8B is used in the combined image with respect to the portion outside the range 801.

Figure 8E:
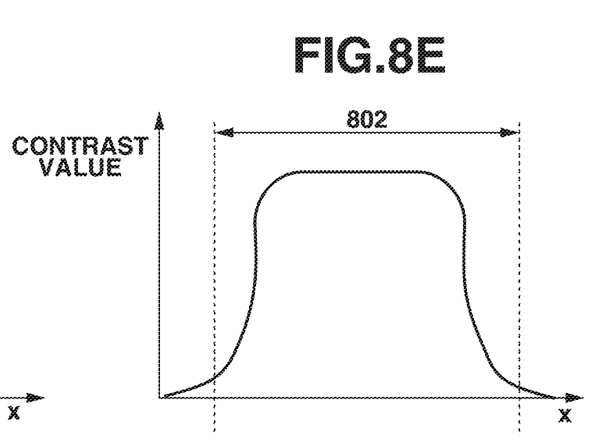
Figure 8F:
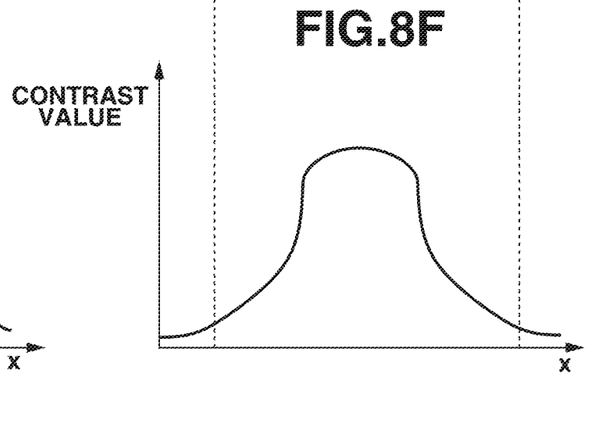

FIGS. 8E and 8F are graphs illustrating the contrast values obtained as a result of filter application to FIGS. 8C and 8D, respectively. The shapes of the graphs in FIGS. 8E and 8F are respectively wider toward each side than those in FIGS. 8C and 8D. Originally, the contrast value of the subject in the in-focus image in FIG. 8C is higher than the contrast value in the blur image in FIG. 8D, and even after the filter application, the contrast value is high in a wider range than the blur image. In a comparison between FIGS. 8E and 8F, the contrast value in a range 802 is higher in FIG. 8E than in FIG. 8F, whereas the contrast value outside the range 802 is lower in FIG. 8E than in FIG. 8F. If the depth combining is performed based on the contrast values in FIGS. 8E and 8F, the blur in FIG. 8B is used in the combined image with respect to the portion outside the range 802. However, since the range 802 is wider than the range 801, the blur in the combined image acquired by the evaluation value calculation described herein is less than the blur in the combined image acquired by the above-described conventional technique. Similarly, if a filter having a larger number of taps is applied, a combined image with a fewer blur is acquired. In the present exemplary embodiment, the contrast value adjusted by applying the filters of a different number of taps and applying the gains is calculated as the evaluation value, and the combining ratio is calculated.

Figure 9A:
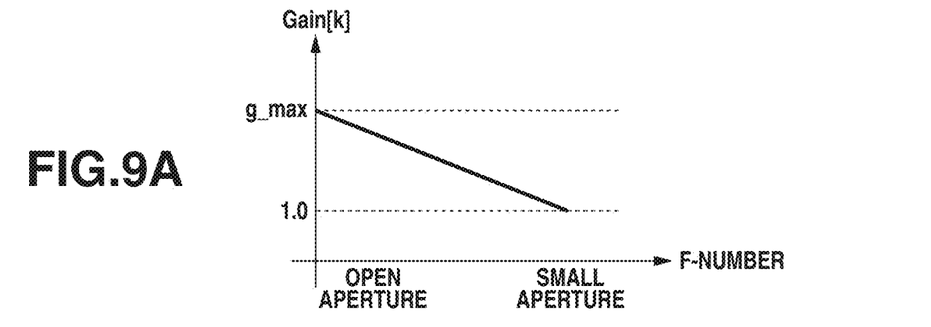
FIGS. 9A, 9B, 9C, and 9D illustrate a gain according to the first exemplary embodiment of the disclosure.

FIGS. 9A to 9D illustrate the gain according to the present exemplary embodiment. The graphs in FIGS. 9A to 9D each illustrate the relationship between an image capturing condition and the Gain(k). For example, FIG. 9A indicates that an aperture value, which is one of the image capturing conditions, and the amount of gain have a negative correlation. As described above in the background section with reference to FIG. 12, the blur increases at larger open apertures, and the contrast value at the same position around the subject (blur portion) increases. Furthermore, even in a case of images captured at the same focus position, an edge blur of a blur image increases at larger open apertures, and the contrast value of the blur portion at the same position increases. In order to prevent the edge blur of the blur image from being selected in the combining described below, the contrast value of the edge blur generated as a result of expansion of the tack-sharp image is to be further increased. Thus, as illustrated in FIG. 9A, the gain is set larger at larger open apertures so that the contrast value of the blur spread from the tack-sharp image after the filter application is set larger than the contrast value of the same position in the blur image, and thus the tack-sharp image is more likely to be selected in the combining described below. Especially, the larger the number of taps of the filter is, the wider the blur in the tack-sharp image after the filter application becomes, so that the gain is set larger with respect to a larger number of taps of the filter. In this way, the position of the blur spread from the tack-sharp image is more likely to be selected in the combining. For example, in FIG. 9A, g_max is set larger with respect to a filter having a larger number of taps.

Figure 9B:
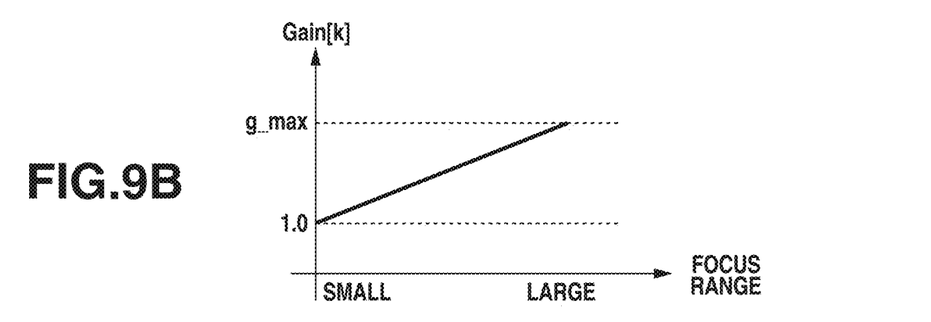
Figure 9C:
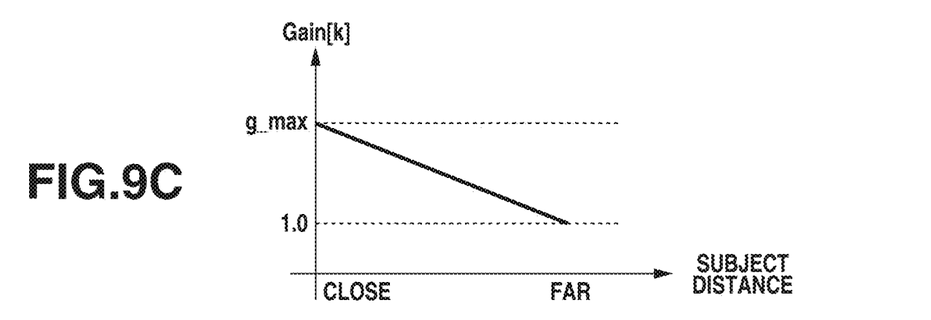

The gain can be changed based on the focus range or the subject distance besides the aperture value. FIGS. 9B and 9C illustrate the relationship between the focus range and the subject distance and the Gain(k). The larger the focus range is, the wider the edge blur becomes, so that the amount of defocus and the Gain(k) have a positive correlation. As used herein, the term "focus range" refers to the difference between the focus position that is situated at the shortest distance and the focus position that is situated at the greatest distance. Similarly, the closer the subject distance is, the wider the edge blur becomes, so that the subject distance and the Gain(k) have a negative correlation. As in the description of the aperture value, a filter having a larger number of taps can increase the gain.

Figure 9D:
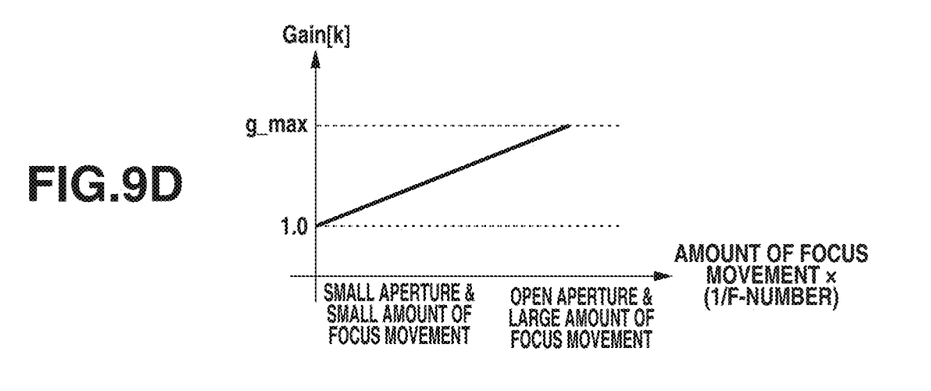

The above-described conditions may be used singly or in combination to control the gain. For example, in a case where the focus range is large at the open aperture side, the expansion of the edge blur is larger than that in a case where the focus range is small at the same aperture value. Thus, as illustrated in FIG. 9D, the amount of focus movement×(1/F-number) is defined as a new condition, and control is performed so as to increase the Gain[k] at larger values of the new condition (the focus range is large at the open aperture side).

A method of calculating the subject distance described above will be briefly described below. A publicly-known technique can be used to calculate the subject distance and, for example, the subject distance can be calculated using the amount of positional deviation (amount of parallax) of the image. Alternatively, a depth-from-defocus (DFD) method in which the subject distance is calculated using images of different focus positions can be used. The method is not limited to the above-described methods, and any method whereby the subject distance is calculable can be used.

In step S603, the image processing unit 107 generates an evaluation value Em(x, y) of the mth image by integrating the contrast values to which the gains are applied in step S602. Examples of an integration method include, but are not limited to, a method in which the contrast values to which the gains are applied are added or averaged.

In step S604, whether steps S601 to S603 are executed on every image is determined. If steps S601 to S603 are executed on every image (YES in step S604), the processing proceeds to step S605.

In step S605, the image processing unit 107 determines the combining ratio based on the evaluation value calculated in step S603. Specifically, a combining ratio of 100% is set to the coordinates having the highest contrast value among the pixels situated at the same coordinates (x, y) in the m images.

Alternatively, the image processing unit 107 generates the combining map based on formula 6 below.

$$A_m(x, y) = \frac{E_m(x, y)}{\sum_{k=1}^{M} E_k(x, y)} \quad \text{(formula 6)}$$

In formula 6, M is the number of images, and (x, y) are coordinates. Further, in step S503, a calculation result of formula 6 is substituted into formula 7 below to thereby generate a combined image.

$$O(x, y) = \sum_{k=1}^{M} A_k(x, y) \cdot I_k(x, y) \quad \text{(formula 7)}$$

In formula 7, Ik(x, y) is the pixel value of the coordinates (x, y) in the kth image, and O(x, y) is the pixel value of the coordinates (x, y) in the combined image.

Further, deformation can be performed as needed during the calculation of formula 6. For example, in the calculation of the fraction of RHS of formula 6, the value of Em(x, y) that is not greater than a predetermined value may be determined as zero. Furthermore, in a case where a result of calculation of the right side of formula 6 is greater than or equal to a predetermined value, Am may be determined as 100%.

In the first exemplary embodiment, the images are combined using the evaluation value obtained by applying the filters of a different number of taps to the calculated contrast value to obtain output values, applying the gains to the output values to obtain values, and integrating the obtained values, whereby a combined image with a reduced edge blur is generated.

In the first exemplary embodiment, the processing whereby the contrast value is spread to the neighboring pixels is realized using the filters of a different number of taps. In a second exemplary embodiment, the contrast value is spread to the neighboring pixels using multi-resolution images. Differences between the second exemplary embodiment and the first exemplary embodiment will mainly be described. Description of similarities to the first exemplary embodiment is omitted.

The processes according to the second exemplary embodiment are similar to those illustrated in FIGS. 2 to 5 according to the first exemplary embodiment. However, the process of generating the combining map in step S502 in the second exemplary embodiment is different from that in the first exemplary embodiment.

Figure 10:
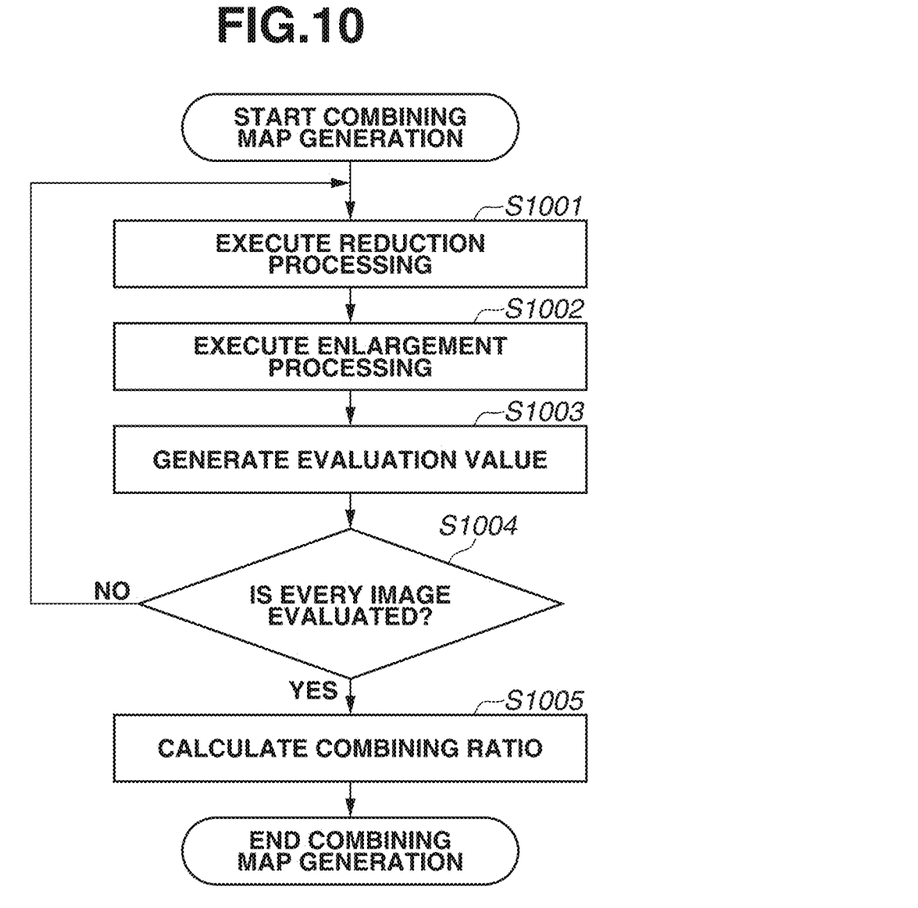
FIG. 10 is a flowchart illustrating a process of generating a combining map according to a second exemplary embodiment of the disclosure.
Figure 11:
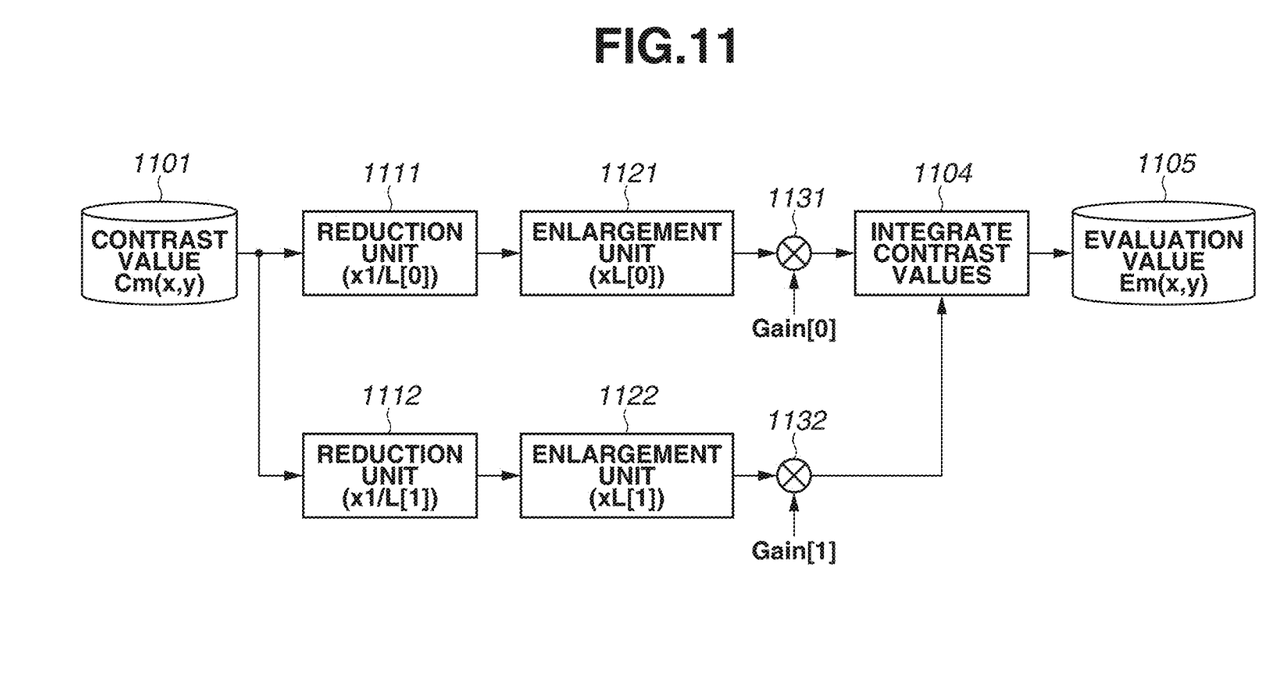
FIG. 11 is a block diagram illustrating the process of generating a combining map according to the second exemplary embodiment of the disclosure.

FIG. 10 is a flowchart illustrating the process of generating the combining map in step S502 in the second exemplary embodiment. FIG. 11 is a block diagram illustrating the process of generating the combining map in step S502 in the second exemplary embodiment.

In step S1001, the image processing unit 107 performs reduction processing on the contrast value calculated in step S501 using reduction units 1111 (reduction rate 1/L[0]) and 1112 (reduction rate 1/L[1]) of different reduction rates. The output of the reduction unit 1111 is enlarged by an enlargement unit 1121 (enlargement rate L[0]), and the output of the reduction unit 1112 is enlarged by an enlargement unit 1122 (enlargement rate L[1]). L[1] indicates a numerical value larger than L[0]. While FIG. 11 illustrates the example in which two reduction units and two enlargement units are provided, the number of reduction units and enlargement units is not limited. Further, the reduction unit 1111 and the enlargement unit 1121 can be configured to provide through-output (signal of which input and output are the same). As described above, the reduction rate and the enlargement rate that are reciprocal numbers are used, so that an image is returned to its original size through one reduction enlargement processing.

The above-described parallel reduction and enlargement processing makes it possible to spread the detected contrast value to the neighboring region, as in the first exemplary embodiment. Thus, the contrast value in a blur-spread portion of the tack-sharp image becomes higher than the contrast value of a pixel in which an edge blur occurs in a blur image, so that the tack-sharp image is more likely to be output.

While a nearest-neighbor, bilinear, or bicubic method can be used as the reduction or enlargement method, any other method whereby the calculated contrast value is spreadable to neighboring pixels can be used.

Step S1003 and subsequent steps (the processing of applying a gain to the processing of generating a combined image) are similar to those in the first exemplary embodiment, so that description thereof is omitted.

According to the second exemplary embodiment, images are combined using the evaluation value obtained by performing processing using the multi-resolution image, applying the gains to obtain values, and integrating the obtained values, whereby a combined image with a reduced edge blur is generated.

Other Exemplary Embodiment

While the digital camera for personal use has been described in the exemplary embodiments, the disclosure is also applicable to any apparatus provided with a depth combining function, such as a mobile phone, smartphone, or network camera connected to a server. Alternatively, part of the above-described processing may be performed by a mobile phone, smartphone, or network camera connected to a server.

The aspect of the embodiments is also realizable by a process in which a program for realizing one or more functions of the above-described exemplary embodiments is supplied to a system or apparatus via a network or recording medium and one or more processors of a computer of the system or apparatus read and operate the program. Further, the aspect of the embodiments is also realizable by a circuit (e.g., ASIC) configured to realize one or more functions.

According to an aspect of the embodiments, an image processing apparatus capable of reducing a blur contained in an image acquired by capturing a plurality of images of different focus positions and combining the captured images can be provided.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-104921, filed May 31, 2018, which is hereby incorporated by reference herein in its entirety.

What is claimed is:

1. An apparatus comprising:
   at least one memory configured to store instructions; and
   at least one processor coupled to the at least one memory and configured to execute the instructions to:
   detect a contrast from a plurality of images of a focus position, wherein viewing angles of the plurality of images overlaps at least partially;
   adjust the contrast of the plurality of images using a plurality of filters having a different reference range;
   set a combining ratio based on the adjusted contrast;
   combine the plurality of images based on the combining ratio to generate a combined image;
   spread the contrast of the image in which a subject is brought into focus among the plurality of images; and
   set, based on the contrast of a corresponding position in the plurality of images, the combining ratio for the combining to the corresponding position.

2. The apparatus according to claim 1, wherein an edge blur of the subject is narrower in the combined image generated based on the adjusted contrast than in a combined image generated based on the contrast that is not adjusted.

3. The apparatus according to claim 1, wherein the plurality of images is adjusted, and the contrast of an edge blur in the adjusted image in which the subject is brought into focus is higher than the contrast of the corresponding position of the edge blur in the adjusted image in which the subject is not brought into focus.

4. The apparatus according to claim 1, wherein the corresponding position becomes a same position after positions of the plurality of images are adjusted so as to match the viewing angles.

5. The apparatus according to claim 1, wherein the at least one processor further executes the instruction to set the combining ratio in such that the larger combining ratio is set with respect to the higher contrast in the contrast of the corresponding position in each of the plurality of images.

6. The apparatus according to claim 1, wherein the at least one processor further executes the instruction to determine, as the adjusted contrast, a contrast obtained by applying the plurality of filters having the different reference range to the contrast of the image, applying gains, and integrating.

7. The apparatus according to claim 6, wherein the at least one processor further executes the instruction to change the gain applied to the contrast to which the filter is applied based on a reference range of the filter.

8. The apparatus according to claim 7, wherein the gain that is applied to the contrast to which the filter having a first reference range is applied is larger than the gain that is applied to the contrast to which the filter having a second reference range narrower than the first reference range is applied.

9. The apparatus according to claim 1, wherein the at least one processor further executes the instruction to adjust the contrast by performing a plurality of parallel reduction and enlargement processes on the image.

10. The apparatus according to claim 9, wherein a reduction rate and an enlargement rate used in each of the plurality of parallel reduction and enlargement processes are a reciprocal number.

11. The apparatus according to claim 9, wherein the at least one processor further executes the instruction to determine, as the adjusted contrast, a contrast obtained by performing the reduction and enlargement processes on the image, applying gains, and integrating.

12. The apparatus according to claim 11, wherein the gain that is applied to the image enlarged at a first enlargement rate is larger than the gain that is applied to the image enlarged at a second enlargement rate smaller than the first enlargement rate.

13. The apparatus according to claim 6,
    wherein the at least one processor further executes the instruction to determine the gain based on an image capturing condition, and
    wherein the image capturing condition includes at least one of an aperture value, a focus range, and a subject distance.

14. The apparatus according to claim 13, wherein the at least one processor further executes the instruction to determine the gain in such that the larger the aperture value, the smaller the gain, the narrower the focus range, the smaller the gain, or the greater the subject distance, the smaller the gain.

15. The apparatus according to claim 13, wherein the focus range is a range between the focus position of the plurality of images that is situated at a shortest distance and the focus position of the plurality of images that is situated at a greatest distance.

16. The apparatus according to claim 13, wherein the subject distance is calculated using an amount of parallax.

17. An apparatus comprising:
- an image sensor configured to capture a plurality of images of a focus position, wherein viewing angles of the plurality of images overlaps at least partially;
- at least one memory configured to store instructions; and
- at least one processor coupled to the at least one memory and configured to execute the instructions to:
- detect a contrast from the plurality of images;
- adjust the contrast of the plurality of images using a plurality of filters having a different reference range;
- set a combining ratio based on the adjusted contrast;
- combine the plurality of images based on the combining ratio to generate a combined image;
- spread the contrast of the image in which a subject is brought into focus among the plurality of images; and
- set, based on the contrast of a corresponding position in the plurality of images, the combining ratio for the combining to the corresponding position.

18. A method for controlling an apparatus, the method comprising:
- detecting a contrast from a plurality of images of a focus position, wherein viewing angles of the plurality of images overlaps at least partially;
- adjusting the contrast of the plurality of images using a plurality of filters having a different reference range;
- setting a combining ratio based on the adjusted contrast;
- combining the plurality of images based on the combining ratio to generate a combined image;
- spreading the contrast of the image in which a subject is brought into focus among the plurality of images; and
- setting, based on the contrast of a corresponding position in the plurality of images, the combining ratio for the combining to the corresponding position.

19. A computer-readable storage medium storing instructions that cause a computer to execute a method for controlling an apparatus, the method comprising:
- detecting a contrast from a plurality of images of a focus position, wherein viewing angles of the plurality of images overlaps at least partially;
- adjusting the contrast of the plurality of images using a plurality of filters having a different reference range;
- setting a combining ratio based on the adjusted contrast;
- combine the plurality of images based on the combining ratio to generate a combined image;
- spreading the contrast of the image in which a subject is brought into focus among the plurality of images; and
- setting, based on the contrast of a corresponding position in the plurality of images, the combining ratio for the combining to the corresponding position.

\* \* \* \* \*